United States Patent
Tirpak

(10) Patent No.: US 10,404,649 B2
(45) Date of Patent: Sep. 3, 2019

(54) CONTENT DELIVERY OPTIMIZATION USING ADAPTIVE AND DYNAMIC DNS

(71) Applicant: DISH Technologies L.L.C., Englewood, CO (US)

(72) Inventor: Christopher Boyd Tirpak, Monument, CO (US)

(73) Assignee: DISH Technologies L.L.C., Englewood, CO (US)

( * ) Notice: Subject to any disclaimer, the term of this patent is extended or adjusted under 35 U.S.C. 154(b) by 329 days.

(21) Appl. No.: 15/455,914

(22) Filed: Mar. 10, 2017

(65) Prior Publication Data

US 2018/0097772 A1    Apr. 5, 2018

Related U.S. Application Data

(60) Provisional application No. 62/402,739, filed on Sep. 30, 2016.

(51) Int. Cl.
*H04L 29/06* (2006.01)
*H04L 29/12* (2006.01)

(52) U.S. Cl.
CPC ........ *H04L 61/106* (2013.01); *H04L 61/1511* (2013.01); *H04L 61/302* (2013.01); *H04L 61/305* (2013.01); *H04L 61/309* (2013.01); *H04L 65/4084* (2013.01); *H04L 65/4092* (2013.01); *H04L 65/80* (2013.01); *H04L 61/6009* (2013.01)

(58) Field of Classification Search
CPC . H04L 61/106; H04L 61/1511; H04L 61/302; H04L 67/2842; G06F 16/9574; G06F 16/958
See application file for complete search history.

(56) References Cited

U.S. PATENT DOCUMENTS

| | | | |
|---|---|---|---|
| 7,337,910 B2* | 3/2008 | Cartmell | H04L 29/06 209/245 |
| 8,526,405 B2* | 9/2013 | Curtis | H04L 29/12066 370/328 |
| 2002/0116456 A1* | 8/2002 | Morita | A63F 13/12 709/203 |

(Continued)

OTHER PUBLICATIONS

Apple Technical Note TN2288, Example Playlist Files for use with HTTP Live Streaming, Retrieved from: https://developer.apple.com/library/content/technotes/tn2288/_index.html, Accessed on May 31, 2017, 18 pages.

(Continued)

*Primary Examiner* — Ranodhi Serrao
(74) *Attorney, Agent, or Firm* — Kilpatrick Townsend & Stockton LLP

(57) ABSTRACT

Systems, methods, and computer program products for determining network characteristics are provided. The network characteristics may be used to facilitate changes to how content is delivered over a network, such as to avoid network congestion, to provide improved throughput, or to provide a good (or better) user experience, such as when streaming media. For example, the network characteristics may be determined, in part, by tracking domain name resolution requests by using specially formulated domain names that require resolution at an authoritative name server.

20 Claims, 6 Drawing Sheets

(56) References Cited

U.S. PATENT DOCUMENTS

| | | | |
|---|---|---|---|
| 2002/0138649 A1* | 9/2002 | Cartmell | H04L 29/06 709/245 |
| 2004/0004967 A1* | 1/2004 | Nakatsugawa | H04L 29/12311 370/400 |
| 2004/0064501 A1 | 4/2004 | Jan et al. | |
| 2004/0083306 A1* | 4/2004 | Gloe | H04L 29/12066 709/245 |
| 2004/0215707 A1* | 10/2004 | Fujita | H04L 29/06 709/201 |
| 2007/0118668 A1 | 5/2007 | McCarthy et al. | |
| 2009/0024698 A1* | 1/2009 | Ho | G06F 16/9577 709/203 |
| 2009/0067395 A1* | 3/2009 | Curtis | H04L 29/12066 370/338 |
| 2009/0082008 A1* | 3/2009 | Thorell | G06F 11/362 455/423 |
| 2010/0088405 A1 | 4/2010 | Huang et al. | |
| 2012/0179801 A1* | 7/2012 | Luna | H04L 61/1511 709/223 |
| 2017/0272316 A1* | 9/2017 | Johnson | H04L 61/301 |
| 2017/0272485 A1* | 9/2017 | Gordon | H04N 21/222 |

OTHER PUBLICATIONS

International Search Report and Written Opinion for PCT/US2017/052164 dated Dec. 1, 2017, all pages.
International Preliminary Report on Patentability for PCT/US2017/052164 dated Apr. 2, 2019, all pages.

* cited by examiner

Manifest File 201

EXTM3U
EXT-X-STREAM-INF:PROGRAM-ID=1,BANDWIDTH=387197,RESOLUTION=480x272
http://server.example.com/Low-Bandwidth-Stream.m3u8
EXT-X-STREAM-INF:PROGRAM-ID=1,BANDWIDTH=591545,RESOLUTION=480x272
http://server.example.com/Medium-Bandwidth-Stream.m3u8
EXT-X-STREAM-INF:PROGRAM-ID=1,BANDWIDTH=872523,RESOLUTION=480x272
http://server.example.com/High-Bandwidth-Stream.m3u8

Manifest File 202

EXTM3U
EXT-X-TARGETDURATION:13
EXT-X-MEDIA-SEQUENCE:0
EXT-X-VERSION:4
EXTINF:10.0,
http://server.example.com/segmentA-High.ts
EXTINF:10.0,
http://serverB-$CLIENTID.example.com/segmentB-High.ts
EXTINF:10.0,
http://serverC-$CLIENTID.example.com/segmentC-High.ts
EXTINF:9.0,
http://server.example.com/segmentD-High.ts Manifest File 203

EXTM3U
EXT-X-STREAM-INF:PROGRAM-ID=1,BANDWIDTH=387197,RESOLUTION=480x272
http://server.example.com/Low-Bandwidth-Stream.m3u8
EXT-X-STREAM-INF:PROGRAM-ID=1,BANDWIDTH=591545,RESOLUTION=480x272
http://server.example.com/Medium-Bandwidth-Stream.m3u8

FIG. 2

CONTENT DELIVERY OPTIMIZATION USING ADAPTIVE AND DYNAMIC DNS

CROSS-REFERENCE TO RELATED APPLICATIONS

This application claims the benefit of and priority to U.S. Provisional Application No. 62/402,739, filed on Sep. 30, 2016, which is hereby incorporated by reference in its entirety.

FIELD

This application relates generally to content delivery. More particularly, this application relates to methods for improving the delivery of content when network bottlenecks or problems are encountered by tracking domain name resolution requests.

BACKGROUND

Some network links may experience overloading and congestion, especially if many client devices share the capacity of the network link. For example, each client device may take up only a fraction of the network link capacity, but if many client devices are making use of the network link, the client devices may experience network slowdowns compared to the full capacity of the network link or their allotted bandwidth. In extreme cases, network packets may be dropped when insufficient capacity exists for handling all packets that are to be transmitted across the network link.

SUMMARY

Described herein are systems, methods, and computer program products for determining network characteristics. The network characteristics may be used, for example, to facilitate changes to how content is delivered over a network, such as to avoid network congestion, to provide improved throughput, or to provide a good (or better) user experience. For example, the network characteristics may be determined by tracking domain name resolution requests by using specially formulated domain names that require resolution at an authoritative name server.

In a first aspect, methods are provided, such as methods for determining network characteristics. In embodiments, a method of this aspect comprises receiving, such as at a computing device, a request for content from a client device; identifying a first server for serving the content to the client device; transmitting a manifest file to the client device to facilitate the client device obtaining the content, such as a manifest file that includes: a first uniform resource identifier (URI) providing a first identifier for a first segment of a plurality of segments of the content, such as a first URI that includes a first domain name associated with the first server; a second URI providing a second identifier for a second segment of the plurality of segments of the content, such as a second URI that includes a second domain name associated with the first server and different from the first domain name; and a third URI providing a third identifier for a third segment of the plurality of segments of the content, such as a third URI that includes a third domain name associated with the first server and different from the first domain name and the second domain name; receiving, at an authoritative name server, a first domain name resolution request for the second domain name; identifying a first time associated with the first domain name resolution request; receiving, at the authoritative name server, a second domain name resolution request for the third domain name; identifying a second time associated with the second domain name resolution request; and determining a network characteristic associated with the client device, such as by using the first time and the second time.

Optionally, the first server corresponds to a first content delivery network. Optionally, the second domain name includes a first unique identifier for the client device. Optionally, the third domain name includes a second unique identifier for the client device. Optionally, the first and second unique identifiers are optionally the same. Optionally, the second domain name includes a first unique identifier for the second segment and the third domain name includes a second unique identifier for the third segment.

In various embodiments, the content may correspond to streaming media, which may be provided in a variety of formats and or bitrates. For example, adaptive bitrate (ABR) streaming may be used for streaming the media content over a network to a client device. In some embodiments, HTTP live streaming (HLS) may be used for streaming the media content over a network to a client device. It will be appreciated that a variety of formats and media characteristics may be used for streaming media content over a network, and various aspects relating to ABR and HLS streaming will be useful with the techniques described herein. For example, it will be appreciated that different encoded versions of a media file may be delivered to a client devices as short segments to allow for dynamic and on-the-fly changing of bitrates to accommodate characteristics of the network associated with the client, such as available bandwidth, which may change as a function of time. For example, in some embodiments, the network characteristic relates to a network speed associated with the client device. Optionally, determining the network characteristic includes determining a time difference between the first time and the second time, determining a size of the content transferred to the client between the first time and the second time and using the time difference and the size to determine the network characteristic.

ABR and/or HLS streaming may be facilitated by use of manifest files, also referred to herein as playlist files or index files. In one embodiment, the manifest file is a second manifest file. Optionally, a method of this aspect further comprises transmitting a first manifest file to the client device, wherein the first manifest file provides variant URIs for each of a plurality of variants of the content. For example, in some embodiments, each variant of the content corresponds to different bitrate versions of the content. Optionally, at least one of the variant URIs corresponds to the second manifest file.

As the network characteristic is determined using the disclosed techniques, various actions may be implemented to accommodate changes to the network characteristic in order to provide a good experience for a client device or user. For example, in some embodiments, the network characteristic relates to a network speed associated with the client device. Optionally, methods of this aspect may further comprise determining that the network speed is below a threshold level for delivering additional segments of the content having a particular bitrate; and transmitting an instruction to the client device to request additional segments of the content at a lower bitrate than the particular bitrate.

In some embodiments, a server or network link associated with the server, such as a CDN server, that provides the content may be overloaded or experiencing network slowdowns or delays. In embodiments, a good user experience may be achieved by changing the network address associated with the domain name, such as to switch to a different CDN or server providing the content. In an embodiment, methods of this aspect may further comprise identifying a second server for serving additional segments of the content to the client device, such as a second server that is different from the first server; and associating the second server with a domain name used in URIs providing identifiers for the additional segments of the content. Optionally, first server corresponds to a first content delivery network. Optionally, the second server corresponds to a second content delivery network that is different from the first content delivery network.

In some embodiments, an additional or replacement manifest file may be transmitted, such as a manifest file providing different domain names or including a different available bandwidth profile for the content, or a manifest file for additional segments of the content, which may optionally be provided by a different server. In some embodiments, methods of this aspect may further comprise transmitting a second manifest file to the client device to facilitate obtaining additional segments of the content, such as a second manifest file includes a fourth URI providing a fourth identifier for a fourth segment of the plurality of segments of the content. Optionally, the manifest file is a second manifest file. In some embodiments, methods of this aspect may further comprise transmitting a first manifest file to the client device, such as a first manifest file that provides variant URIs for a first plurality of variants of the content, and where each variant of the content corresponds to different bitrate versions of the content. Optionally, at least one of the variant URIs corresponds to the second manifest file. Optionally, methods of this aspect may further comprise transmitting a third manifest file to the client device, such as a third manifest file that provides variant URIs for a second plurality of variants of the content, and where the second plurality of variants fewer than the first plurality of variants.

In some embodiments, the network characteristic may be useful for a plurality of client devices, such as a plurality of client devices sharing a network link between the client devices and the content provider or a CDN. In some embodiments, for example, the network characteristic for one client device is used to prospectively change aspects relating to delivery of content to another client device. For example, if multiple clients are connected to a content provider or CDN via a shared network provider or network link and it is determined that the bandwidth of the network provider or network link is below a particular threshold for one client device, changes to how the content may be delivered for another client device may be made to ensure the other client device experiences a good content delivery experience. For example, in some embodiments, methods of this aspect may further comprise identifying a network provider or network link between the first server and the client device; and facilitating other client devices that use the network provider or network link in obtaining the content from a second server different from the first server. Optionally, methods of this aspect may further comprise identifying a first network provider or first network link between the first server and the client device; receiving a second request for a second content from a second client device; identifying a second network provider or second network link between the first server and the second client device; determining that the second network provider is the same as the first network provider or determining that the second network link is the same as the first network link; and identifying a second server for serving the second content to the second client device, such as a second server that is different from the first server. In some embodiments, methods of this aspect may comprise generating a second manifest file for use by the second client device in obtaining the second content, such as a second manifest file that includes a fourth uniform resource locator (URI) providing a fourth identifier for a first segment of a plurality of segments of the second content, such as a fourth URI that includes a fourth domain name associated with the second server; and transmitting the second manifest file to the second client device to facilitate the second client device obtaining the fourth segment.

In another aspect, systems are provided herein, such as systems for determining network characteristics. In embodiments, a system of this aspect comprises one or more first processors; and a first non-transitory computer readable storage medium in data communication with the one or more first processors, such as a first non-transitory computer readable storage medium comprises processor executable instructions that, when executed by the one or more first processors, causes the one or more first processors to perform first operations. In some embodiments, the first operations may comprise one or more of the operations of the above described methods. In a specific embodiment, the first operations comprise receiving a request for content from a client device; identifying a first server for serving the content to the client device; and transmitting a manifest file to the client device to facilitate the client device obtaining the content. Optionally, the manifest file includes a first uniform resource identifier (URI) providing a first identifier for a first segment of a plurality of segments of the content, such as a first URI that includes a first domain name associated with the first server; a second URI providing a second identifier for a second segment of the plurality of segments of the content, such as a second URI that includes a second domain name associated with the first server and different from the first domain name; and a third URI providing a third identifier for a third segment of the plurality of segments of the content, such as a third URI that includes a third domain name associated with the first server and different from the first domain name and the second domain name.

Optionally, systems of this aspect may comprise one or more second processors; and a second non-transitory computer readable storage medium in data communication with the one or more second processors, wherein the second non-transitory computer readable storage medium comprises processor executable instructions that, when executed by the one or more second processors, causes the one or more second processors to perform second operations. In some embodiments, the second operations may comprise one or more of the operations of the above described methods. For example, in some embodiments, the second operations comprise receiving, at an authoritative name server, a first domain name resolution request for the second domain name; identifying a first time associated with the first domain name resolution request; receiving, at the authoritative name server, a second domain name resolution request for the third domain name; identifying a second time associated with the second domain name resolution request; and facilitating determination of a network characteristic associated with the client device using the first time and the second time. For example, facilitating determination of the network characteristic may include determining the network characteristic. Optionally, facilitating determination of the network characteristic may include transmitting the times or a value derived from the times to a remote server, such as the content provider.

In another aspect, computer program products are provided herein, such as computer program products for determining network characteristics. In some embodiments, a computer program product comprises a non-transitory computer readable medium comprising processor executable instructions that, when executed by one or more processors, cause the one or more processors to perform operations. In some embodiments, the operations may correspond to one or more operations of the methods described above. For example, in some embodiments, the operations comprise receiving, at a computing device, a request for content from a client device; identifying a first server for serving the content to the client device; transmitting a manifest file to the client device to facilitate the client device obtaining the content, such as a manifest file that includes a first uniform resource identifier (URI) providing a first identifier for a first segment of a plurality of segments of the content, such as a first URI that includes a first domain name associated with the first server; a second URI providing a second identifier for a second segment of the plurality of segments of the content, such as a second URI that includes a second domain name associated with the first server and different from the first domain name; and a third URI providing a third identifier for a third segment of the plurality of segments of the content, such as a third URI that includes a third domain name associated with the first server and different from the first domain name and the second domain name; facilitating receipt, at an authoritative name server, of a first domain name resolution request for the second domain name; facilitating identification of a first time associated with the first domain name resolution request; facilitating receipt, at the authoritative name server, of a second domain name resolution request for the third domain name; facilitating identification of a second time associated with the second domain name resolution request; and facilitating determination of a network characteristic associated with the client device using the first time and the second time. For example, facilitating receipt may include providing a network address for one or more of the first domain name, second domain name, and third domain name, such as to the authoritative name server. Optionally, facilitating identification may include configuring the authoritative name server to log a time associated with a domain name resolution request. For example, facilitating determination of the network characteristic may include determining the network characteristic. Optionally, facilitating determination of the network characteristic may include transmitting or receiving the times or a value derived from the times to or from a remote server.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 illustrates contents of example manifest files in accordance with some embodiments.

DETAILED DESCRIPTION

In embodiments, the present invention provides systems, methods, and computer program products for determining network characteristics. In some embodiments, a client device may report back information about a network associated with the client device and this information may be used by a content provider to determine a characteristic of the network associated with the client device. Advantageously, the disclosed techniques allow for determination of client device network characteristics without changing functionality on the client device and/or without requiring additional information about the network to be provided by the client device, though this may still be useful for some embodiments. For example, the disclosed techniques do not require any changes to software on the client device and may be achieved, in various embodiments, through changes to how manifest files are constructed, and by taking advantage of characteristics of how domain name system (DNS) resolution requests are handled. For example, by creating manifest files include domain names that require resolution by an authoritative name server under control of or associated with a content provider, the content provider may be able to track domain name resolution requests and use information about the domain name resolution requests to determine characteristics about the network associated with the client device. Optionally, the characteristic may be used to change how content is provided to the client device or other client devices, such as a change associated with where the content is provided from, a network path the content takes, a bitrate of the content, etc.

Figure 1:
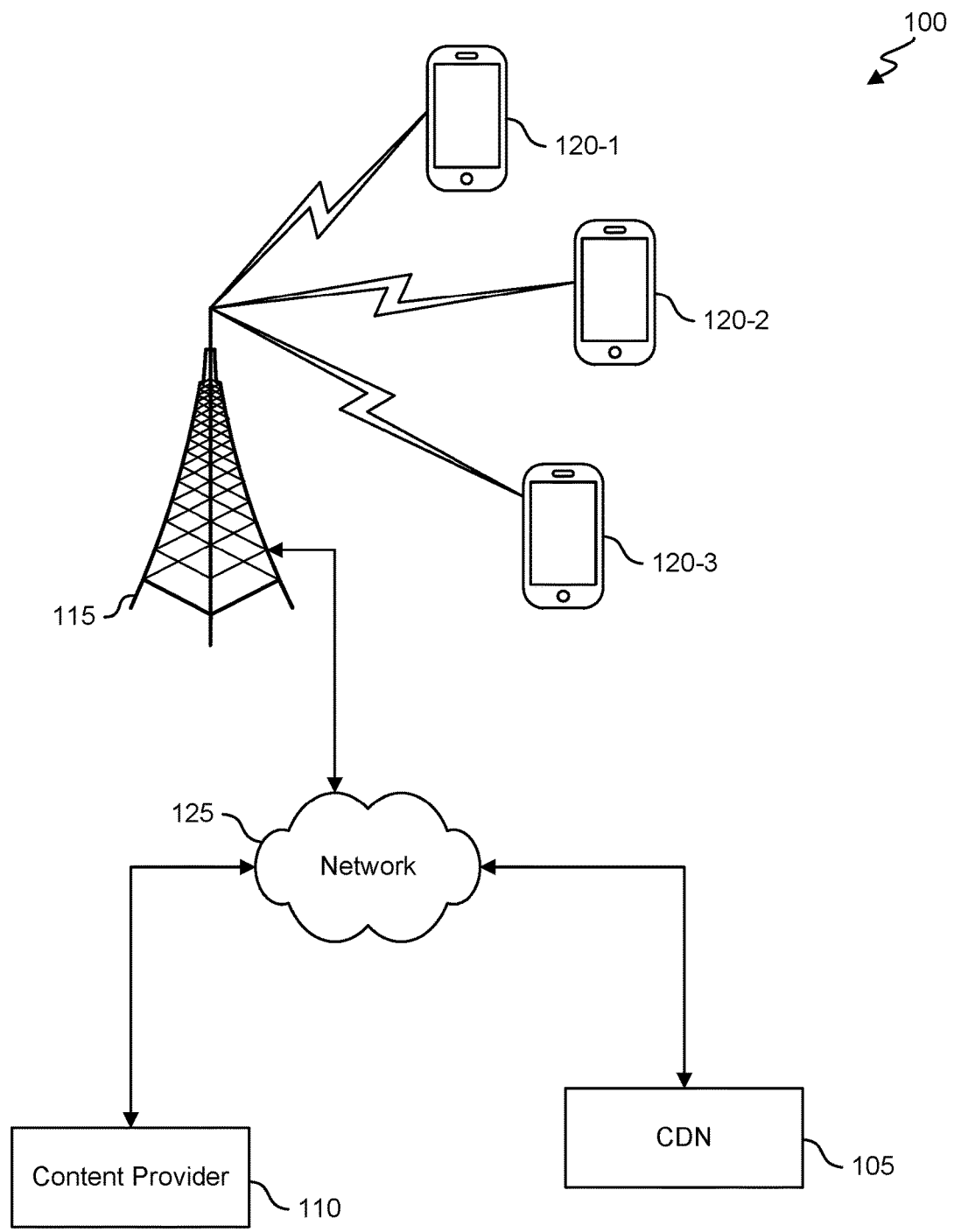
FIG. 1 illustrates an embodiment of a data network.

FIG. 1 illustrates an embodiment of a data network 100 that includes a content delivery network (CDN) 105, a content provider 110, a wireless base station 115, and one or more client devices 120-1, 120-2, and 120-3 (collectively, client devices 120). CDN 105, content provider 110, and wireless base station 115 may be interconnected via one or more networks 125. Without limitation, network 125 may include wired or wireless network links, private networks, public networks (such as the Internet), etc. Although FIG. 1 illustrates a wireless base station providing wireless connectivity between network 125 and client devices 120, it will be appreciated that wired network interconnections and wired network devices may also be used with the techniques described herein. It will be appreciated that data network 100 may include additional or fewer components, depending on the configuration. For example, data network 100 may also include additional CDNs, additional or fewer clients, additional base stations, which may be geographically distributed, etc.

Requests from client devices 120 for content may be received at content provider 110 and delivery of the content to client devices 120 may be facilitated by transmission of content by CDN 105. Upon receipt of the requested content at client devices 120, client devices 120 may playback, display, or output all or portions of the content. Depending on the particular configuration, client devices 120 may also or alternatively store the content.

Various configurations are possible for requesting and delivering content to wireless clients 120. In some embodiments, a content request received by content provider 110 may be directed to CDN 105 for response directly by CDN 105. In some embodiments, a manifest file that identifies one or more content segments may be received by the wireless clients 120, such as may be transmitted and/or generated by content provider 110 or CDN 105. Manifest files, which may also be referred to as playlist files or index files, are described below in further detail with respect to FIG. 2. These files may correspond to text files including uniform resource identifiers (URIs), such as uniform resource locators (URLs), which may correspond to a network, website or Internet address, or other identifiers, that may identify a network location at which all or a portion of the content may be accessed by the wireless clients. Manifest files may be used, in embodiments, for HTTP Live Streaming implementations, for example. In some embodiments, a manifest file identifies different segments of content that together make up a full content object. In some embodiments, a manifest file identifies other manifest files. For example, in some embodiments, a manifest file identifies different URIs corresponding to different manifest files providing different formats of a content object.

It will be appreciated that the content may correspond to, without limitation, one or more of streaming audio content, streaming video content, media files, executable files, text files, image files, program code files, etc. In exemplary embodiments, the content corresponds to streaming media, such as streaming audio and/or streaming video. In exemplary embodiments, the content is broken down into data chunks (also referred to herein as segments) representing different portions of an overall content object. Depending on the configuration, different versions of the data chunks may be available, such as in different formats, different resolutions, different sampling rates, or different data bitrates. As an example, in one embodiment, the content corresponds to a video and the video may be available as a plurality of segments each corresponding to a different portion of the video (such as a first portion, a second portion, a third portion, etc.). Each segment may be available in a plurality of different formats, such as different resolutions and/or bitrates, etc. Depending on the particular configuration, settings, or resource availability, a client device may request or be delivered the various segments in the same or different formats.

For example, a video file may be available in a high-resolution and/or high-bitrate format, a medium-resolution and/or medium-bitrate format, and a low-resolution and/or low-bitrate format and each segment may also be available in corresponding high-resolution and/or high-bitrate, medium-resolution and/or medium-bitrate, or a low-resolution and/or low-bitrate formats. In this way, a client device 120 may be able to receive one segment of the content in a first format and a second segment of the content in a second format. Such configurations are advantageous when network and/or processing resources change moment by moment and the bitrate/resolution of a video file can be changed segment-by-segment to accommodate the resource availability to provide a good user experience (i.e., minimal or no interruptions to delivery/playback of the content). For example, if available network bandwidth is reduced while receiving a streaming media file, the bitrate of the next segment of the streaming media file can be reduced to maintain a good user experience. Upon resumption or increasing the available network bandwidth, the bitrate of a subsequent segment can be returned to the original or a higher bitrate, for example.

It will be appreciated that, in some embodiments, client device 120-1, client device 120-2, and client device 120-3 may share network capacity, such as bandwidth, available at base station 115. This configuration may dictate the available bandwidth for each client device 120, such that if client devices 120-1 and 120-2 are using a large fraction of the available bandwidth, client device 120-3 may only be able to stream a media file at a low bitrate. In some embodiments, it is desirable to limit the available versions of a streaming media file to a client device to accommodate their network capacity.

FIG. 2 depicts three example manifest files 201, 202, and 203. It will be appreciated that a manifest file may be provided in different formats, but a common format is the M3U or Extended M3U formats. The format illustrated for manifest files 201, 202, and 203 is the Extended M3U format. Each manifest file 201, 202, and 203 may correspond to a text file that specifies locations of one or more media files and may also include header, directive, tag, or comment information, for example. As illustrated in FIG. 2, manifest files 201, 202, and 203 begin with a header of #EXTM3U, identifying the files as Extended M3U format files. Following the header of manifest file 201 is a tag, identified by the text "#EXT-X-STREAM-INF", indicating that the next entry in the manifest file identifies another manifest file. The tag also includes information about the additional playlist, such as a program identifier, a bandwidth or bitrate, and a video resolution. It will be appreciated that other information may be included in the tags and that the manifest files illustrated in FIG. 2 are merely examples used for illustration purposes to explain various aspects of the present invention. Following the first #EXT-X-STREAM-INF tag in manifest file 201 is a URI identifying a location of the additional manifest file "http://server.example.com/Low-Bandwidth-Stream.m3u8". In manifest file 201, three additional manifest files are identified, a "Low-Bandwidth-Stream.m3u8" having a bitrate of 387197 bits/second and a resolution of 480×272, a "Medium-Bandwidth-Stream.m3u8" having a bitrate of 591545 bits/second and a resolution of 480×272, and a "High-Bandwidth-Stream.m3u8" having a bitrate of 872523 bits/second and a resolution of 480×272.

Manifest file 202 may correspond to, for example, a manifest file identifying different segments of a media file. Here, header information is included that identifies the manifest file as an Extended M3U format file (#EXTM3U). Additional tag or directive information included in manifest file 202 specifies a maximum duration for the media segments of 13 seconds (#EXT-X-TARGETDURATION:13), the number sequence (0) of the first media file appearing in the manifest file (#EXT-MEDIA-SEQUENCE:0), and the compatibility version of the manifest file (#EXT-X-VERSION:4). Following this, is record marker information (#EXTINF) specific for each segment and the URI corresponding to the segment. The record marker information for the first three segments identifies the segments as having a duration of 10 seconds and the last segment has a duration of 9 seconds. As will be described below, the form of the URIs for each segment may be configured to enable determination of a network characteristic associated with the client device.

Manifest file 203 corresponds to a revised version of manifest file 201 in which the highest bandwidth manifest file has been removed, such as to limit the available bandwidth options for a particular client device.

Figure 3:
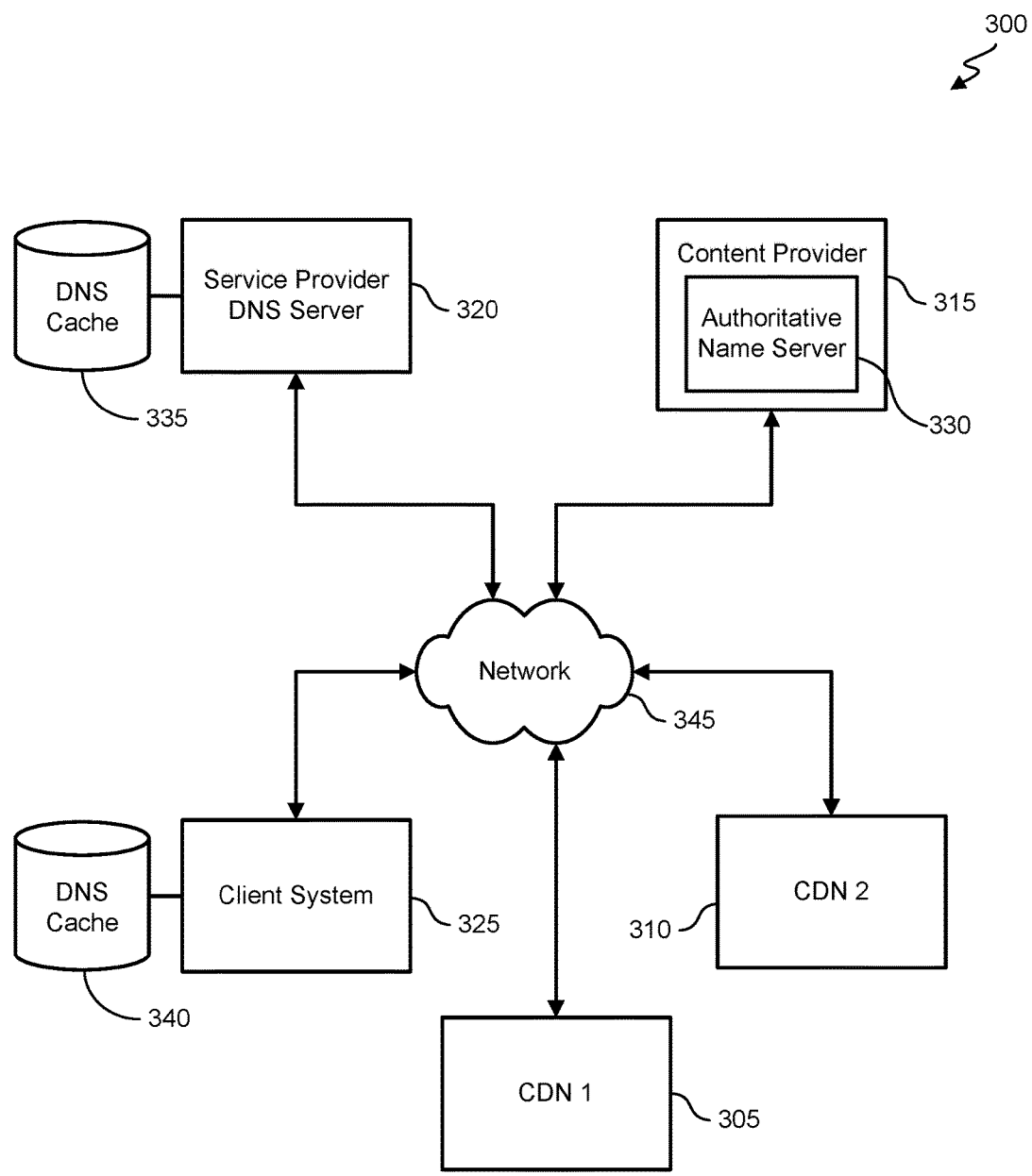
FIG. 3 illustrates an embodiment of a data network.

FIG. 3 depicts a schematic illustration of a data network 300 that includes a first CDN 305, a second CDN 310, a content provider 315 which provides an authoritative name server 330 for particular domain names associated with the content provider, a service provider domain name system (DNS) server 320 and its DNS cache 335, and a client system 325 and its DNS cache 340. Each of the systems 305-325 may be in data communication with one another through a network 345, which may include wired and/or wireless portions, and public or private data links. All or portions of network 345 may include the Internet.

Client system 325 may request content from content provider 315 over network 345. In response to the request, client system 325 may receive a manifest file from content provider 315 over network 345. The manifest file may optionally identify additional manifest files. The manifest file or the additional manifest files may identify uniform resource indicators (URIs) for various segments of the content. Each of the segments of the content file may be provided to the client system 325 over network 345 from any of a number of different systems, depending on the particular configuration of URIs in the manifest file. For example, in one embodiment, one or more segments of the content are provided to client system 325 over network 345 from first CDN 305. In one embodiment, one or more segments of the content are provided to client system 325 over network 345 from second CDN 310. In one embodiment, one or more segments of the content are provided to client system 325 over network 345 from content provider 315. Other configurations are possible, including where additional servers not depicted in FIG. 3 provide one or more segments of the content to the client system 325. In addition, it will be appreciated that while authoritative name server 330 is depicted as internal to content provider 315, authoritative name server 330 may correspond to a separate system from content provider 315.

In order to keep a manifest file simple, yet flexible, the manifest file may identify a domain name in a URI. The domain name may correspond to an identification string that identifies one (or more) servers on a network. Domain names may be resolved to a network address, such as an IP address, by way of a domain name resolution request. As used herein, the term domain name may refer to a fully qualified domain name, which includes all portions of a domain name allowing absolute lookup or resolution of a network address associated with the domain name. A domain name resolution may be performed by a variety of systems, including those referred to herein as DNS servers.

In one embodiment, the system that requires resolution of a domain name may possess a cache of domain names (also referred to herein as a DNS cache) and associated network addresses and may simply look up the domain name in the cache to obtain the network address. In FIG. 3, the client system 325 is illustrated as having a DNS cache 340 and so this DNS cache 340 may be used first and foremost by client system 325 to determine if a particular domain name has already been resolved and the associated IP address has been stored to DNS cache 340. Such a local lookup is useful for saving time and network resources, as local lookups may be significantly faster than network lookups and require no network resources.

If a particular domain name is not available in the DNS cache 340, client system 325 may send a request to a service provider's DNS server 320 to resolve the particular domain name to a network address. In some embodiments, intermediate systems, such as routers or gateways, may facilitate the lookup of the particular domain name in the service provider DNS server 320. The service provider DNS server 320 may correspond to an Internet service provider (ISP) providing network connectivity to the Internet for client system 325. In some embodiments, the service provider DNS server 320 may not be associated with the ISP and may be associated with another entity. For example, some systems may be configured to use a domain name resolution server remote from an ISP DNS server, such as may be associated with OpenDNS, or the Google Public DNS, etc. Regardless of the entity associated with the service provider DNS server 320, the service provider DNS server 320 may have its own DNS cache 335, which stores domain names and associated network addresses to facilitate and expedite the lookup of a particular domain name. It will be appreciated that, in some embodiments, DNS cache 335 may be periodically or aperiodically updated with changes or updates to one or more domain name entries to facilitate domain name resolution requests made by end user systems, such as client system 325.

In some instances, however, DNS cache 335 may still not include an entry for a particular domain name. In such instances, the service provider DNS server 320 may request resolution of a particular domain name by another DNS server, such as in a recursive fashion. In some embodiments, the DNS server that the request reaches may be an authoritative name server, such as authoritative name server 330. An authoritative name server, as used herein, corresponds to the DNS server that provides an original and definitive answer to a domain name resolution request for a particular domain. In some embodiments, an authoritative name server may be configured to resolve domain names to network addresses for particular domain names that are not resolvable by any other DNS server.

In some embodiments, the domain names used in URIs in a manifest file may be unique, such that they are not resolvable by an DNS server other than the authoritative name server. Various configurations are possible to achieve or force resolution of a domain name by an authoritative server. For example, in some embodiments the domain names may include an identifier, such as a unique identifier, associated with a particular client device. In some embodiments, the domain names may include an identifier, such as a unique identifier, associated with a particular segment. In some embodiments the domain names may include a first identifier, such as a first unique identifier, associated with a particular client device and a second identifier, such as a second unique identifier, associated with a particular segment. Returning to FIG. 2, one or more domain names used in the URIs in the manifest file 202 may be configured to achieve or force resolution of a domain name by an authoritative server.

For example, in the first segment of the content, the domain name is identified as "server.example.com", which may not require resolution at an authoritative name server, and may be included in a DNS cache at a client device or a service provider DNS server. For the second segment of the content, the domain name is identified as "serverB-$CLIENTID.example.com" and for the third segment of the content, the domain name is identified as "serverC-$CLIENTID.example.com". Here "$CLIENTID" is intended to correspond to a unique identifier or particular name associated with the requesting client device. In some embodiments, "$CLIENTID" is replaced with an appropriate value by the content provider before sending the manifest file to the requesting client. The text "serverB" and "server" may also correspond to identifiers associated with the particular segment. In some embodiments, "$CLIENTID" is replaced by the requesting client device upon receiving the manifest file from content provider. As an example, the string used to replace "$CLIENTID" may be any useful string that may uniquely be associated with a particular client device. In some embodiments, however, a string for "$CLIENTID" may be shared among different client devices such that the string is not completely unique. In embodiments, the string that "$CLIENTID" is replaced with may include one or more of a host identifier, such as a hostname, an IP address or other network identifier (such as a media access control (MAC) address), or representation thereof, such as 192-168-1-123 or 080007A9B2FC, a domain name or portion thereof, a date dependent string, such as 2016-07-20, a time dependent string, such as 12-34-56. As a specific example, "$CLIENTID" may be replaced by a hostname, such as "John-PC" so that the full domain name of the second and third URIs include domain names of "serverB-John-PC.example.com" and "serverC-John-PC.example.com", respectively. It will be appreciated that these examples are not intended to be limiting and that other strings may be included in a domain name in a URI in a manifest file to achieve the benefits and inventive concepts described herein.

Advantageously, the domain names for a plurality of segments in a manifest file may be resolved by the authoritative name server, which allows the authoritative name server to track the name server resolution requests as they are generated by the client device. For example, with reference to manifest file 202, the client device will first request the file "segmentA-High.ts" from the server "server.example.com", which may resolve to a content delivery network server or a content provider server, for example.

When the next segment of content is needed, the client device will request the file "segmentB-High.ts" from the server "serverB-John-PC.example.com" (assuming that "$CLIENTID" is replaced by "John-PC" as described above), which will be resolved by the authoritative name server and may be resolved to the same or different server as for the file "segmentA-High.ts". This resolution request may advantageously be tracked and/or logged by the authoritative name server, such as to enable recordation of a time associated with the resolution request.

When the next segment of content is needed, the client device will request the file "segmentC-High.ts" from the server "serverC-John-PC.example.com" (assuming again that "$CLIENTID" is replaced by "John-PC" as described above), which will be resolved by the authoritative name server and may be resolved to the same or different server as for the files "segmentA-High.ts" and/or "segmentB-High.ts". This resolution request may advantageously be tracked and/or logged by the authoritative name server, such as to enable recordation of a time associated with the resolution request. Again, it will be appreciated that the embodiments described here are merely examples and that additional or different information may be included in the manifest files, such as additional or fewer segments, including additional segments between URIs that must be resolved by an authoritative name server.

In embodiments, the authoritative name server may use the tracked information relating to the resolution requests to determine a network characteristic associated with the client device. For example, the time difference between the resolution requests for "serverB-John-PC.example.com" and "serverC-John-PC.example.com" may correspond to the amount of time needed to deliver the segment "segmentB-High.ts" to the client device. If the size of the segment "segmentB-High.ts" is known, the size divided by the time may correspond to a measure of a bitrate or network capacity at the client device, or, for example, to the lowest capacity network link between the client device and the server providing the segment. For purposes of illustration, assuming that the size of the "segment-High.ts" segment is about 8520 kB, that the DNS resolution request for "serverB-John-PC.example.com" is received at the authoritative name server with a time stamp of 2016-07-21-12:30:01.05, and that the DNS resolution request for "serverC-John-PC.example.com" is received at the authoritative name server with a time stamp of 2016-07-21-12:30:07.23, this would indicate that 7.18 seconds elapsed between the DNS resolution requests and that 8520 kB of data were transferred during this time, resulting in a computed network throughput of 8520 kB/7.18 seconds=1186.63 kB/s.

In some embodiments, the manifest file may include additional entries that may be tracked in a similar fashion to allow longer term or additional statistical information regarding the network characteristics to be determined. This may allow the content provider to identify network problems, such as reduced network throughput or a non-optimal server or network link operation. Again, obtaining this continuing and/or statistical information is facilitated because the authoritative name server can track the receipt of domain name resolution requests because they are actually received at the authoritative name server rather than a service provider DNS server or a DNS cache, for example.

Figure 4:
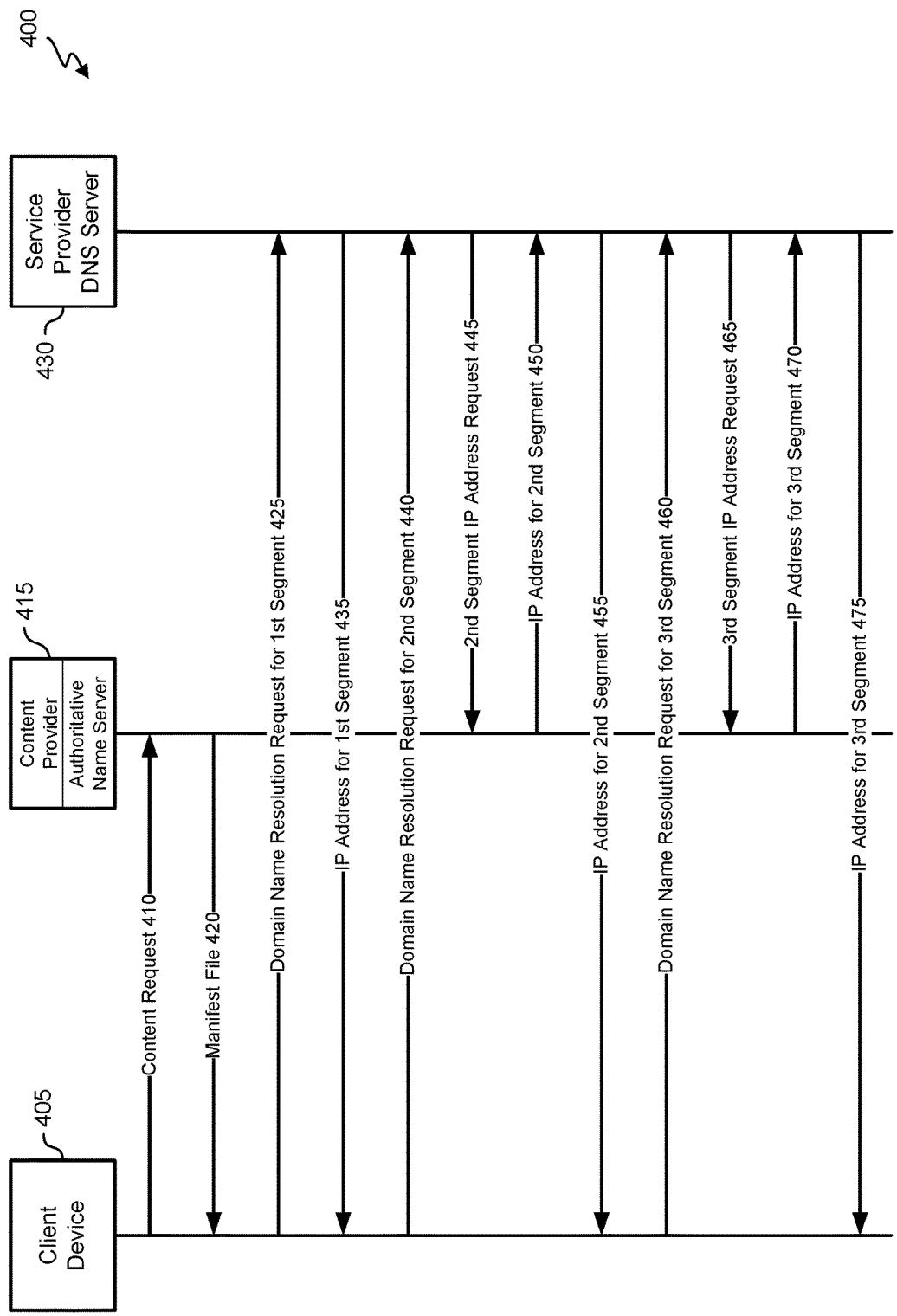
FIG. 4 provides a schematic illustration of communications between devices.

FIG. 4 provides an overview of another example 400 of how the inventive concepts described herein may operate. In the embodiment illustrated, a client device 405 is in network communication with a content provider 415, which includes an authoritative name server, as well as a service provider DNS server 430. Client device 405 may transmit a content request 410, which is received by content provider 415. In response, content provider 415 may transmit manifest file 420, which is received by client device 405. It will be appreciated that the manifest file may correspond to a manifest file constructed as consistent with the above description to allow tracking of domain name resolution requests by the authoritative name server of content provider 415.

Client device 405 may optionally transmit a domain name resolution request for a first segment 425, which may be received at service provider DNS server 430. Service provider DNS server 430 may transmit the IP address needed to obtain the first segment 435, which may be received by the client device 405. The IP address may then be used by the client device to obtain the first segment. It will be appreciated that such a domain name resolution request and response associated with the first segment may be optional, as some manifest files may not include a first segment to be resolved by some server other than an authoritative name server, while other manifest files may have segments with domain names that may be cached by client device 405 and so an external lookup process may not be necessary.

Client device 405 may transmit a domain name resolution request for a second segment 440, which may be received at service provider DNS server 430. Service provider DNS server 430 may check its DNS cache to determine that the domain name for the second segment does not have an entry in the DNS cache. The service provider DNS server 430 may need to transmit a second segment IP address request 445, which may be a domain name resolution request, to be received by the authoritative name server associated with content provider 415 in order to obtain the IP address needed to obtain the second segment 450. It will again be appreciated that second segment IP address request may not be directly received by the authoritative name server of content provider 415, as a recursive DNS resolution process may involve one or more intermediate DNS servers. In any event, a IP address request 445 may be transmitted by service provider DNS server 430 and an IP address for the second segment 450 may be received by the service provider DNS server 430. The IP address for the second segment 455 may be transmitted by the service provider DNS server for receipt by the client device 405. The IP address may then be used by the client device to obtain the second segment.

Client device 405 may transmit a domain name resolution request for a third segment 460, which may be received at service provider DNS server 430. Service provider DNS server 430 may again check its DNS cache to determine that the domain name for the third segment does not have an entry in the DNS cache. The service provider DNS server 430 may need to transmit a third segment IP address request 465 to be received by the authoritative name server associated with content provider 415 in order to obtain the IP address needed to obtain the third segment 470. As used herein, the phrase "IP address request" may be a domain name resolution request. It will again be appreciated that third segment IP address request may not be directly received by the authoritative name server of content provider 415, as a recursive DNS resolution process may involve one or more intermediate DNS servers. In any event, an IP address request 465 may be transmitted by service provider DNS server 430 and an IP address for the third segment 470 may be received by the service provider DNS server 430. The IP address for the third segment 475 may be transmitted by the service provider DNS server for receipt by the client device 405. The IP address may then be used by the client device to obtain the third segment.

It will be appreciated that the process of domain name resolution request for additional segments may be repeated such that that authoritative name server of content provider 415 may track the domain name resolution requests to facilitate determination of network characteristics associated with client device 405 on an ongoing basis. Such information may be useful, for example, to ensure a good user experience for continued receipt/output of content by client device 405. For example, if it is determined that a particular content delivery network is having difficulty delivering content to a client or a network associated with the client, DNS settings for particular content objects can be changed by the content provider such that a different server, such as a different content delivery network, may serve additional content segments to the client device.

For example, with reference to FIG. 1, if the base station 115 is associated with a particular wireless service provider and it is determined that network throughput between CDN 105 and the wireless service provider for client device 120-1 is lacking capacity or that client device 120-1 does not have a good user experience, the DNS settings may be changed such that another CDN provides additional content segments to client device 120-1 or another client device, such as client device 120-2 or 120-3, such as to attempt to provide a continued good or better user experience.

In addition to adjustment to DNS settings based on determined network characteristics to provide delivery of content from different network servers to client devices, it may be desirable to change a bandwidth of the content being delivered to the client device in order to maintain a good user experience. For example, upon determining that a network characteristic associated with a client device is below a particular threshold value or that the client device may not be able to timely receive continued streaming of a media file at the same bandwidth, or that the streaming of files is not providing a good user experience for a user associated with the client device, a communication may be transmitted by the content provider to the client device to request additional segments of the content at a lower bitrate.

In some embodiments, a new manifest file with a reduced bandwidth profile may be transmitted to the client device. For example, if the manifest file 201, which includes 3 different bandwidth profiles for the streaming content, is first transmitted to the client device and the network characteristics determined using the above described techniques dictate that the client device should switch to a lower bandwidth version of the content, the manifest file 203 may be transmitted to the client device for continued streaming, so that it can no longer obtain the highest bandwidth stream using the new manifest file 203.

Figure 5:
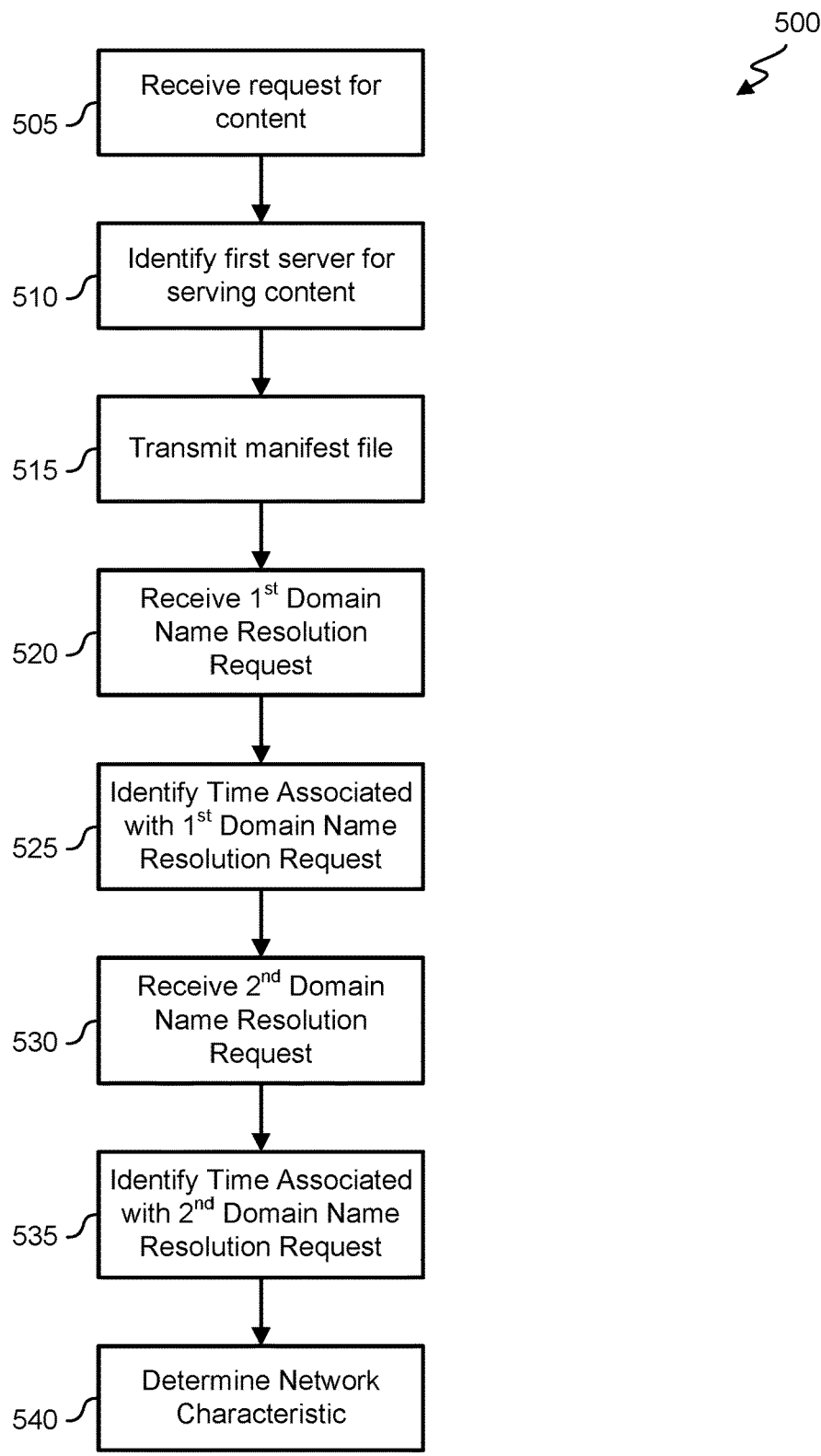
FIG. 5 provides an overview of a method for determining network characteristics in accordance with some embodiments.

Turning next to FIG. 5, an overview of a method embodiment 500 for determining network characteristics is provided. Initially, at block 505, a request for content is received. For example, the request for content may be generated by a client device. The request for content may optionally be received by a content provider. The request for content may optionally be received by a CDN. The request for content may correspond to a http request, for example, activated by a user of the client device, such as by clicking a link on a website, or activating a media playback, etc.

At block 510, a first server for serving content is identified. The first server may optionally correspond to a content provider server, or a CDN server. The first server may be identified in a manifest file as the server a client device should request the content from. For example, a manifest file may include an identifier for the first server in a URI corresponding to a segment of the content.

At block 515, a manifest file is transmitted, such as to the client in response to the request for content. The manifest file may facilitate the client device obtaining the content, such as from a CDN or other server. The manifest file may include one or more URIs providing identifiers for segments of the content. In embodiments, the manifest file includes a first URI including a first domain name for a first segment, a second URI including a second domain name for a second segment, and a third URI including a third domain name for a third segment. For example, the first domain name may be associated with the first server that is identified at block 510. The second domain name may be different from the first domain name, and may be resolvable only by an authoritative name server, for example. Optionally, the second domain name is resolved to the first server. The third domain name may be different from the first domain name and the second domain name, and may be resolvable only by an authoritative name server, for example. Optionally, the third domain name is resolved to the first server.

At block 520, the method continues with reception of a first domain name resolution request, such as at an authoritative name server. The first domain name resolution request may be associated with a client device obtaining a first segment of content. As described previously, the authoritative name server may be included at the content provider system. It will be appreciated that, in some embodiments, the authoritative name server may correspond to software and/or a service operating on a server for providing network addresses in response to domain name resolution requests. Optionally, the authoritative name server is a standalone server that does not serve any other function than providing network addresses in response to domain name resolution requests. In some embodiments, an authoritative name server is a component of a server that provides additional functionality other than providing network addresses in response to domain name resolution requests.

At block 525, a first time associated with the first domain name resolution request is identified. This time may be logged, tracked, and/or stored in memory in order to allow the content provider to use the time in determination of a network characteristic.

At block 530, the method continues with reception of a second domain name resolution request, such as at an authoritative name server. The second domain name resolution request may be associated with a client device obtaining a second segment of content.

At block 535, a second time associated with the second domain name resolution request is identified. Again, this time may be logged, tracked, and/or stored in memory in order to allow the content provider to use the time in determination of a network characteristic. For example, a time difference between the first time and the second time may be computed.

At block 540, a network characteristic may be determined. For example, as described above, the network characteristic may be determined using the first time and the second time. Optionally, the network characteristic is determined using a time difference between the first time and the second time. Other information may also be used in determining the network characteristic, such as a file or segment size.

The characteristic may be useful, as described above, for adjusting how content is delivered to a client device. For example, the characteristic may inform what bitrates of content are suitable for providing a good experience to the client device. For example, if the network characteristic indicates that a client device is not capable of receiving a content stream of a particular bitrate, then a lower bitrate content stream may be provided to the client. As another example, if the network characteristic indicates that a particular network server or network link is overloaded, slow, or otherwise lacking the ability to provide a good experience to the client, a different network server or network link may be used to provide the content to the client.

For example in one embodiment, when it is determined that a particular network server (such as a CDN) or network link is to be changed, a DNS setting may be used to achieve the change. For example, a domain name may be associated with a first CDN or server and the change may correspond to changing the domain name to be associated with a second CDN or server. In this way, the network server or network link used to provide content to a client device may be changed, which advantageously may require no action on the part of the client device or a user associated with the client device.

Figure 6:
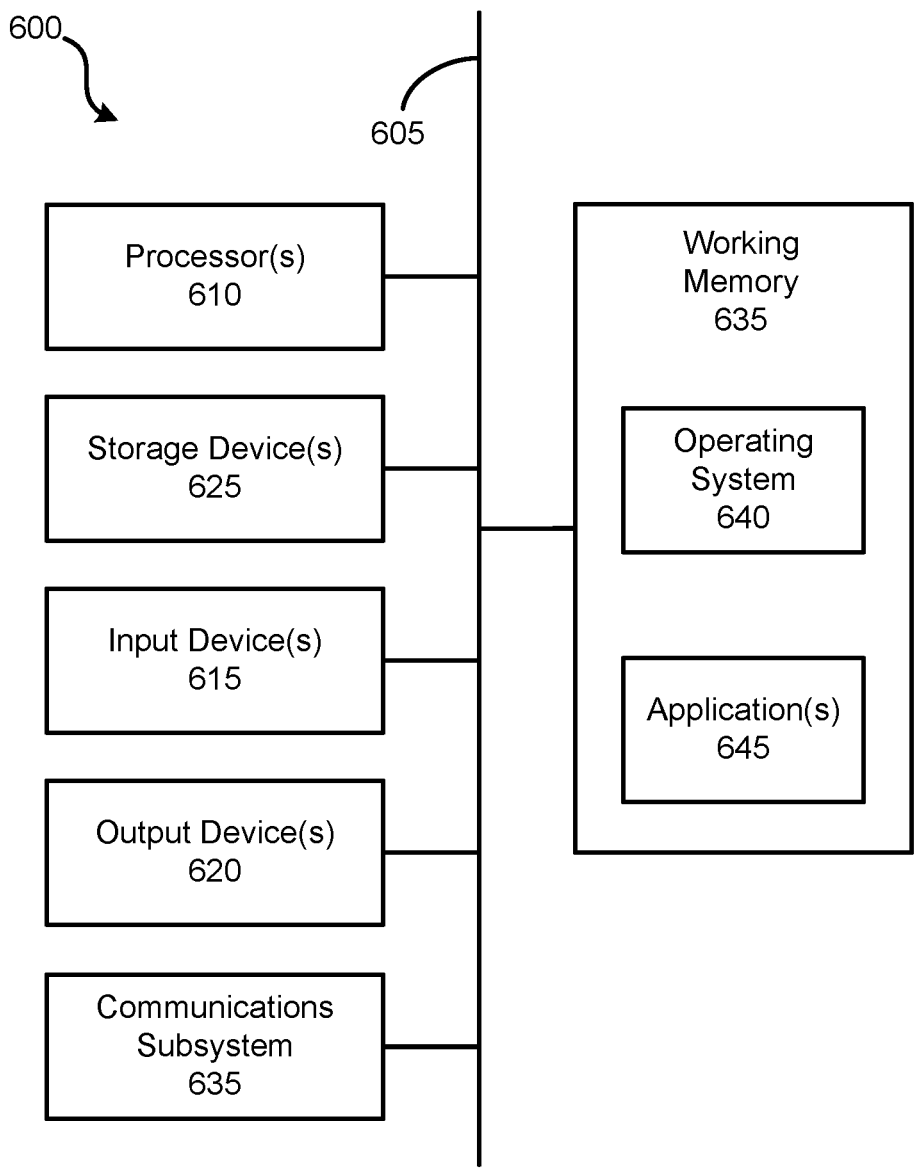
FIG. 6 provides a block diagram of an example computing device, in accordance with some embodiments.

A computing device as illustrated in FIG. 6 may be incorporated as part of the previously described computerized devices, such as CDN 105, content provider 110, client devices 120, CDN 305, CDN 310, content provider 315, service provider DNS server 320, client system 125, etc. FIG. 6 provides a schematic illustration of one embodiment of a computing device 600 that may perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computing device 600 is shown comprising hardware elements that may be electrically coupled via a bus 605 (or may otherwise be in communication). The hardware elements may include one or more processors 610, including without limitation one or more general-purpose processors and/or one or more special-purpose processors (such as digital signal processing chips, graphics acceleration processors, video decoders, and/or the like); one or more input devices 615, which may include without limitation a mouse, a touchscreen, keyboard, remote control, voice input, and/or the like; and one or more output devices 620, which may include without limitation a display device, a printer, speaker, etc.

The computing device 600 may further include (and/or be in communication with) one or more non-transitory storage devices 625, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device 600 might also include a communications subsystem 630, which may include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), a G.hn device, and/or the like. The communications subsystem 630 may permit data to be exchanged with a network (such as the network described below, to name one example), other computer systems, and/or any other devices described herein. In many embodiments, the computing device 600 will further comprise a working memory 635, which may include a RAM or ROM device, as described above.

The computing device 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computing device 600. In other embodiments, the storage medium might be separate from a computer system (e.g., a removable medium, such as a compact disc, or a cloud- or network-based storage system), and/or provided in an installation package, such that the storage medium may be used to program, configure, and/or adapt a general purpose computer with the instructions/code stored thereon. These instructions might take the form of executable code, which is executable by the computing device 600 and/or might take the form of source and/or installable code, which, upon compilation and/or installation on the computing device 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device (such as the computing device 600) to perform methods in accordance with various embodiments of the invention. According to a set of embodiments, some or all of the procedures of such methods are performed by the computing device 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computing device 600 may be distributed across a network. For example, some processing may be performed in one location using a first processor while other processing may be performed by another processor remote from the first processor. Other components of computing device 600 may be similarly distributed. As such, computing device 600 may be interpreted as a distributed computing system that performs processing in multiple locations. In some instances, computing device 600 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, at a computing device, a request for content from a client device;
   identifying a first server for serving the content to the client device;
   transmitting a manifest file to the client device to facilitate the client device obtaining the content, wherein the manifest file includes:
     a first uniform resource identifier (URI) providing a first identifier for a first segment of a plurality of segments of the content, wherein the first URI includes a first domain name, and wherein the first domain name is associated with the first server;
     a second URI providing a second identifier for a second segment of the plurality of segments of the content, wherein the second URI includes a second domain name, wherein the second domain name is associated with the first server, and wherein the second domain name is different from the first domain name; and
     a third URI providing a third identifier for a third segment of the plurality of segments of the content, wherein the third URI includes a third domain name, wherein the third domain name is associated with the first server, and wherein the third domain name is different from the first domain name and the second domain name;
   receiving, at an authoritative name server, a first domain name resolution request for the second domain name;
   identifying a first time associated with the first domain name resolution request;
   receiving, at the authoritative name server, a second domain name resolution request for the third domain name;
   identifying a second time associated with the second domain name resolution request; and
   determining, using the first time and the second time, a network characteristic associated with the client device.

2. The method of claim 1, wherein the first server corresponds to a first content delivery network.

3. The method of claim 1, wherein the second domain name includes a first unique identifier for the client device, wherein the third domain name includes a second unique identifier for the client device.

4. The method of claim 1, wherein the second domain name includes a first unique identifier for the second segment, and wherein the third domain name includes a second unique identifier for the third segment.

5. The method of claim 1, wherein the manifest file is a second manifest file, and wherein the method further comprises:
   transmitting a first manifest file to the client device, wherein the first manifest file provides variant URIs for each of a plurality of variants of the content, wherein each variant of the content corresponds to different bitrate versions of the content, and wherein at least one of the variant URIs corresponds to the second manifest file.

6. The method of claim 1, wherein the network characteristic relates to a network speed associated with the client device.

7. The method of claim 1, wherein the determining the network characteristic includes determining a time difference between the first time and the second time, determining a size of the content transferred to the client between the first time and the second time and using the time difference and the size to determine the network characteristic.

8. The method of claim 1, wherein the network characteristic relates to a network speed associated with the client device, and wherein the method further comprises:
   determining that the network speed is below a threshold level for delivering additional segments of the content having a particular bitrate; and
   transmitting an instruction to the client device to request additional segments of the content at a lower bitrate than the particular bitrate.

9. The method of claim 1, further comprising:
   identifying a second server for serving additional segments of the content to the client device, wherein the second server is different from the first server; and
   associating the second server with a domain name used in URIs providing identifiers for the additional segments of the content.

10. The method of claim 9, wherein the first server corresponds to a first content delivery network and wherein the second server corresponds to a second content delivery network that is different from the first content delivery network.

11. The method of claim 1, further comprising:
    transmitting a second manifest file to the client device to facilitate obtaining additional segments of the content, wherein the second manifest file includes a fourth URI providing a fourth identifier for a fourth segment of the plurality of segments of the content.

12. The method of claim 1, wherein the manifest file is a second manifest file, and wherein the method further comprises:
    transmitting a first manifest file to the client device, wherein the first manifest file provides variant URIs for a first plurality of variants of the content, wherein each variant of the content corresponds to different bitrate versions of the content, and wherein at least one of the variant URIs corresponds to the second manifest file;
    transmitting a third manifest file to the client device, wherein the third manifest file provides variant URIs for a second plurality of variants of the content, and wherein the second plurality of variants fewer than the first plurality of variants.

13. The method of claim 1, further comprising:
    identifying a network provider or network link between the first server and the client device; and
    facilitating other client devices that use the network provider or network link in obtaining the content from a second server different from the first server.

14. The method of claim 1, further comprising:
identifying a first network provider or first network link between the first server and the client device;
receiving a second request for a second content from a second client device;
identifying a second network provider or second network link between the first server and the second client device;
determining that the second network provider is the same as the first network provider or determining that the second network link is the same as the first network link; and
identifying a second server for serving the second content to the second client device, wherein the second server is different from the first server.

15. The method of claim 14, further comprising:
generating a second manifest file for use by the second client device in obtaining the second content, wherein the second manifest file includes:
a fourth URI providing a fourth identifier for a first segment of a plurality of segments of the second content, wherein the fourth URI includes a fourth domain name, and wherein the fourth domain name is associated with the second server; and
transmitting the second manifest file to the second client device to facilitate the second client device obtaining the fourth segment.

16. A system comprising:
one or more first processors; and
a first non-transitory computer readable storage medium in data communication with the one or more first processors, wherein the first non-transitory computer readable storage medium comprises processor executable instructions that, when executed by the one or more first processors, causes the one or more first processors to perform first operations including:
receiving a request for content from a client device;
identifying a first server for serving the content to the client device;
transmitting a manifest file to the client device to facilitate the client device obtaining the content, wherein the manifest file includes:
a first uniform resource identifier (URI) providing a first identifier for a first segment of a plurality of segments of the content, wherein the first URI includes a first domain name, and wherein the first domain name is associated with the first server;
a second URI providing a second identifier for a second segment of the plurality of segments of the content, wherein the second URI includes a second domain name, wherein the second domain name is associated with the first server, and wherein the second domain name is different from the first domain name; and
a third URI providing a third identifier for a third segment of the plurality of segments of the content, wherein the third URI includes a third domain name, wherein the third domain name is associated with the first server, and wherein the third domain name is different from the first domain name and the second domain name;
one or more second processors; and
a second non-transitory computer readable storage medium in data communication with the one or more second processors, wherein the second non-transitory computer readable storage medium comprises processor executable instructions that, when executed by the one or more second processors, causes the one or more second processors to perform second operations including:
receiving, at an authoritative name server, a first domain name resolution request for the second domain name;
identifying a first time associated with the first domain name resolution request;
receiving, at the authoritative name server, a second domain name resolution request for the third domain name;
identifying a second time associated with the second domain name resolution request; and
facilitating determination of a network characteristic associated with the client device using the first time and the second time.

17. The system of claim 16, wherein the first server corresponds to a first content delivery network.

18. The system of claim 16, wherein the second domain name includes a first unique identifier for the client device, wherein the third domain name includes a second unique identifier for the client device.

19. The system of claim 16, wherein the second domain name includes a first unique identifier for the second segment, and wherein the third domain name includes a second unique identifier for the third segment.

20. A non-transitory computer readable medium comprising processor executable instructions that, when executed by one or more processors, cause the one or more processors to perform operations including:
receiving, at a computing device, a request for content from a client device;
identifying a first server for serving the content to the client device;
transmitting a manifest file to the client device to facilitate the client device obtaining the content, wherein the manifest file includes:
a first uniform resource identifier (URI) providing a first identifier for a first segment of a plurality of segments of the content, wherein the first URI includes a first domain name, and wherein the first domain name is associated with the first server;
a second URI providing a second identifier for a second segment of the plurality of segments of the content, wherein the second URI includes a second domain name, wherein the second domain name is associated with the first server, and wherein the second domain name is different from the first domain name; and
a third URI providing a third identifier for a third segment of the plurality of segments of the content, wherein the third URI includes a third domain name, wherein the third domain name is associated with the first server, and wherein the third domain name is different from the first domain name and the second domain name;
facilitating receipt, at an authoritative name server, of a first domain name resolution request for the second domain name;
facilitating identification of a first time associated with the first domain name resolution request;
facilitating receipt, at the authoritative name server, of a second domain name resolution request for the third domain name;
facilitating identification of a second time associated with the second domain name resolution request; and facilitating determination of a network characteristic associated with the client device using the first time and the second time.

\* \* \* \* \*